United States Patent [19]

Edwards et al.

[11] Patent Number: 4,788,225

[45] Date of Patent: Nov. 29, 1988

[54] LOW DENSITY POROUS ELASTIC CROSS-LINKED POLYMERIC MATERIALS AND THEIR PREPARATION

[75] Inventors: Christopher John C. Edwards, Buxtehude, Fed. Rep. of Germany; Donald P. Gregory; Martin Sharples, both of Wirral, England

[73] Assignee: Lever Brothers Company, New York, N.Y.

[21] Appl. No.: 22,143

[22] Filed: Mar. 4, 1987

[30] Foreign Application Priority Data

Mar. 26, 1986 [GB] United Kingdom ................. 8607535

[51] Int. Cl.$^4$ ............................................. C08J 9/28
[52] U.S. Cl. ..................................... 521/147; 521/62; 521/63; 521/64; 521/149; 521/150
[58] Field of Search ..................... 521/62, 63, 64, 147, 521/149, 150

[56] References Cited

U.S. PATENT DOCUMENTS

| Re. 27,444 | 7/1972 | Will | 521/62 |
|---|---|---|---|
| 4,461,848 | 7/1984 | Lawson et al. | 521/64 |
| 4,483,945 | 11/1984 | Beresford et al. | 521/64 |
| 4,489,174 | 12/1984 | Karickhoff | 521/64 |
| 4,522,953 | 6/1985 | Barby et al. | 521/64 |
| 4,536,521 | 8/1985 | Haq | 521/63 |
| 4,611,014 | 9/1986 | Jones et al. | 521/64 |
| 4,612,334 | 9/1986 | Jones et al. | 521/64 |

*Primary Examiner*—Morton Foelak
*Attorney, Agent, or Firm*—Milton L. Honig; James J. Farrell

[57] ABSTRACT

This invention discloses a novel elastic cross-linked porous polymer having a porosity in the range 75 to 98% internal phase volume and having interconnected pores, said pores having a mean pore diameter in the range 15 $\mu$m to 80 $\mu$m, said polymer having an elastic return from 50% compression to 90% of initial thickness of less than 120 seconds, and a process for its production.

5 Claims, No Drawings

LOW DENSITY POROUS ELASTIC CROSS-LINKED POLYMERIC MATERIALS AND THEIR PREPARATION

This invention relates to low density polymeric materials, more particularly to low density porous elastic cross-linked polymeric materials and methods for their preparation. The porous materials comprise pores interconnected by holes in their side walls so forming a permeable structure.

PRIOR ART

In U.S. Pat. No. 4,522,953 there have been disclosed novel polymeric materials prepared from high internal phase emulsions and these materials have outstanding porosity with respect to hydrophobic liquids such as oils. These known materials are prepared by polymerising water-in-oil high internal phase emulsions comprising various vinyl monomers and using certain selected surfactants.

Other specifications referred to in the above-mentioned United States patent have disclosed the preparation of porous polymeric beads and, also, the use of various pre-formed polymers together with monomers to prepare water-filled porous objects.

THE PRESENT INVENTION

It has now been found that by careful selection of monomers and by control of processing conditions low density porous cross-linked polymeric materials having a useful degree of elasticity can be obtained.

Accordingly, the present invention provides an elastic cross-linked porous polymer having a porosity in the range 75 to 98% and having interconnected pores, said pores having a mean pore diameter in the range 15 to 80 μm, said polymer having an elastic return from 50% compression to 90% of original thickness of less than 120 seconds.

Preferably the elastic porous polymer has an elastic return from 50% compression to 90% of initial thickness of less than 40 seconds.

Any elastic material will have a glass transition temperature below ambient temperature i.e. its surrounding temperature. Thus the present porous polymers should have a glass transition temperature (Tg) below ambient temperature, which is usually room temperature, but can be above or below room temperature depending on the conditions of the intended use of the polymer.

In a preferred form of this invention, the polymer comprises up to 50% by weight of styrene and at least 50% by weight of an alkyl acrylate or methacrylate. In a further preferred form of the invention, the alkyl acrylate comprises 2-ethyl hexyl acrylate, n-butyl acrylate or a mixture thereof.

A surprising feature of the present invention is that the desired elastic properties of the porous polymer are only achieved when the mean pore diameter is in the specified range. It has been found that additional or excessive mixing of the emulsion, which reduces both the breadth and mean value of the distribution of pore diameters, produces a material which collapses irreversibly on drying. Preferably the elastic cross-linked polymer has pores having a mean pore diameter in the range 25 μm to 80 μm.

Accordingly, in a further aspect of the present invention there is provided a process for the preparation of an elastic porous polymer in which the monomers, at least one of which is polyfunctional, and an oil-soluble surfactant are mixed together and an aqueous phase is added in sufficient quantity to generate a high internal phase volume emulsion in the range 75 to 98% internal phase volume, the emulsion being given further sufficient stirring to generate droplets having a mean droplet diameter in the range 15 to 80 μm, said emulsion in the presence of a polymerisation initiator then being subjected to heating to polymerise the monomers.

Suitably a water-soluble polymerisation initiator is employed and is added to the monomer mixture in the aqueous phase. Alternatively, however, or as well as an oil-soluble polymerisation initiator can be employed, suitably being admixed with the monomer mixture prior to addition of the aqueous phase.

The porous polymer produced by the above process will have the desired structure for the production of an elastic porous polymer. However, the porous polymer will contain residual surfactant and for some applications this should be removed. Accordingly, in a further preferred form of the present invention, the polymer is washed substantially free of surfactant and dried to produce the novel elastic cross-linked porous polymer provided according to the present invention.

The oil-soluble surfactant to be used in the preparation of the high internal phase emulsion preferably has an HLB value in the range of about 2 to about 6 and a preferred surfactant is sorbitan monooleate sold under the trade name Span 80.

To determine the distribution of pore sizes and the mean pore diameter of the porous polymer an image analysis technique was used to compile a histogram representing the distribution of void sizes in the sample. The image analysis was carried out on a fracture surface of the dried porous elastic polymer. The mean void diameter $\bar{d}$ was then calculated as the number-average $\bar{d} = \Sigma n_i d_i / \Sigma n_i$ where $n_i$ is the number of voids of diameter $d_i$ in bin i of the histogram.

The term "elastic return" employed in the present specification and claims is defined by the following experiment.

Dry samples of the washed porous polymeric material, in the form of cylinders 5.5 cm in diameter and 2 cm thick were compressed to approximately 50% of their initial thickness using an Instron Tensometer (model 4202) at a strain rate of 2.5 mm min$^{-1}$. The samples were kept in a compressed state for 30 seconds and the load was then released. The time for recovery from 50% to 90% of the initial sample thickness was determined using a high speed video camera and a graduated scale mounted behind the sample.

The polymer may be a cross-linked homopolymer or a copolymer with a Tg below ambient and the preferred monomers for use according to the present invention include styrene, 2-ethyl hexyl acrylate, n-butyl and isobutyl acrylate, hexyl acrylate, lauryl methacrylate and isodecyl methacrylate and mixtures thereof. Other monomers can also be used providing the glass transition temperature (Tg) of the final polymer is below ambient temperature.

Suitable cross-linking agents for use in this invention include divinyl benzene, diethylene glycol dimethacrylate and 3-butylene dimethacrylate.

The preferred degree of cross-linking ranges from 2% to about 20% and is preferably about 5%.

A factor concerned with stability of the emulsion is the presence in the aqueous phase of a water-soluble salt. Suitable salts include soluble sodium, calcium and aluminium salts. The amount present depends on the monomer and surfactant combination and is related to the valences of the metal component of the salt and it is preferred to use a polyvalent salt.

The following examples illustrate the preparation of the porous elastic polymeric materials provided by this invention.

EXAMPLE 1

2 g of SPAN 80 were dissolved in a mixture of 6 ml of 2-ethyl hexyl acrylate, 4 ml of styrene and 1 ml of commercial divinyl benzene (DVB) containing $\approx 0.5$ ml of ethyl vinyl benzene. The aqueous phase (100 ml of water containing 2.5 gl$^{-1}$ of potassium persulphate and 0.1 moles l$^{-1}$ of calcium chloride) was dispersed in the monomer mixture using a three bladed paddle stirrer in a polypropylene beaker. Once all the aqueous phase was added the high internal phase emulsion was stirred for a further 120 seconds and then poured into a polypropylene bottle and sealed. The emulsion was then left to polymerise at 60° C. for approximately 8 hours.

The sample was removed from its container and squeezed to remove the aqueous phase. The porous polymer was then washed in water and isopropanol by repeatedly squeezing and re-expanding the sample. Finally the sample was squeezed to remove the last isopropanol wash liquor and allowed to dry in air.

A sample of the dried, cleaned surfactant-free polymer was subjected to the elastic return test as described above.

Further porous polymer samples were made using the procedure outlined above with different styrene-/ethyl hexyl acrylate compositions and the results are set out below in Table I.

TABLE I

| Starting Composition (Styrene:EHA) +10% DVB | Time to Return from 50% to 90% Initial Thickness (seconds) | Mean Pore Diameter (μm) | Tg (°C.) |
|---|---|---|---|
| 50:50 | ∞ | 60 | 32 |
| 40:60 | 30 | 55 | 26 |
| 30:70 | 20 | 62 | −11 |
| 20:80 | 9 | 64 | −20 |

Mixing time for example—2 minutes.

From the above table it will be appreciated that the content of ethyl hexyl acrylate in the total composition has a significant effect upon the elastic return time. Each of the above samples had an internal phase volume of 90%.

EXAMPLE 2

2 g of SPAN 80 were dissolved in a mixture of 7 ml of n-butyl acrylate, 3 ml of styrene and 1 ml of commercial divinyl benzene (DVB) containing $\approx 0.5$ ml of ethyl vinyl benzene. 100 ml of an aqueous phase containing 2.5 gl$^{-1}$ of potassium persulphate and 0.1 moles l$^{-1}$ of calcium chloride were dispersed in the monomer mixture using a three bladed paddle stirrer in a polypropylene beaker. Once all the aqueous phase was added the high internal phase emulsion was stirred for a further 120 seconds and then poured into a polypropylene mould and sealed. The emulsion was then left to polymerise at 60° C. for approximately 8 hours. The sample was then washed and dried as set out in Example 1.

The present procedure was repeated employing 2 g of Span 80, 8 ml of n-butyl acrylate, 2 ml of styrene, 1 ml of DVB and 100 ml of the aqueous phase containing 2.5 gl$^{-1}$ potassium persulphate and 0.1 moles$^{-1}$ calcium chloride.

Each of the resulting washed and dried polymers was subjected to the elastic return test described above. The results are given in Table II.

TABLE II

| Starting Composition (styrene:n-butyl acrylate) | Time to return from 50% to 90% Initial Thickness (seconds) | Mean Pore Diameter (μm) |
|---|---|---|
| 40:60 | ∞ | 34 |
| 30:70 | 90 | 32.5 |
| 20:80 | 40 | 35 |
| 10:90 | 6 | 32.5 |

As in Example 1 the sample with the greater amount of acrylate had the shorter elastic return time. Each of the above samples had an internal phase of approximately 91%. The sample having an infinite time to return from 50% to 90% initial thickness had a glass transition temperature (Tg) above ambient temperature whilst those samples embodying the present invention had a glass transition temperature (Tg) below ambient temperature, which in the present case was a room temperature of 23° C.

We claim :

1. An elastic cross-linked porous polymer derived from vinyl polymerization of a mixture of monomer, comprising from about 2% to about 20% of a difunctional unsaturated cross-linking monomer, up to 50 weight % styrene and at least 50 weight % of a monomer selected from the group consisting of an alkyl acrylate, methacrylate and mixtures thereof, said polymer having a porosity in the range 75 to 95% internal phase volume and having interconnected pores, said pores having a mean pore diameter in the range 15 μm to 80 μm, said polymer having an elastic return from 50% compression to 90% of initial thickness of less than 120 seconds.

2. An elastic porous polymer as claimed in claim 1 having an elastic return from 50% compression to 90% of initial thickness of less than 40 seconds.

3. An elastic porous polymer as claimed in claim 1, in which the alkyl acrylate comprises 2-ethyl-hexyl-acrylate.

4. An elastic porous polymer as claimed in claim 1 in which the said pores have a mean pore diameter in the range 25 μm to 80 μm.

5. An elastic porous polymer as claimed in claim 1, in which the polymer has a void volume of between 85 and 93%.

* * * * *